(12) United States Patent
Nishida

(10) Patent No.: US 10,666,834 B2
(45) Date of Patent: May 26, 2020

(54) INFORMATION PROCESSING SYSTEM, INFORMATION PROCESSING APPARATUS, AND INFORMATION PROCESSING METHOD

(71) Applicant: Takayori Nishida, Kanagawa (JP)

(72) Inventor: Takayori Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/274,289

(22) Filed: Feb. 13, 2019

(65) Prior Publication Data

US 2019/0306371 A1  Oct. 3, 2019

(30) Foreign Application Priority Data

Mar. 28, 2018  (JP) .................. 2018-062095

(51) Int. Cl.
H04N 1/00 (2006.01)
H04N 1/44 (2006.01)
G06F 3/12 (2006.01)
G06F 9/455 (2018.01)

(52) U.S. Cl.
CPC ........... *H04N 1/4413* (2013.01); *G06F 3/122* (2013.01); *G06F 3/1238* (2013.01); *G06F 9/45558* (2013.01); *G06F 2009/4557* (2013.01); *G06F 2009/45583* (2013.01)

(58) Field of Classification Search
CPC ..... H04N 1/4413; G06F 3/1238; G06F 3/122; G06F 9/45558; G06F 2009/4557; G06F 2009/45583

USPC ....................................... 358/1.14
See application file for complete search history.

(56) References Cited

U.S. PATENT DOCUMENTS

| | | |
|---|---|---|
| 2010/0051681 A1 | 3/2010 | Nishida |
| 2011/0063667 A1 | 3/2011 | Nishida |
| 2011/0273738 A1 | 11/2011 | Tanaka et al. |
| 2012/0320410 A1* | 12/2012 | Kakegawa ............ G06F 3/1219 358/1.15 |
| 2013/0014112 A1 | 1/2013 | Nishida |
| 2013/0141752 A1 | 6/2013 | Nishida |
| 2013/0194612 A1 | 8/2013 | Nishida |
| 2013/0329245 A1 | 12/2013 | Nishida |
| 2014/0055809 A1 | 2/2014 | Nishida |

(Continued)

FOREIGN PATENT DOCUMENTS

| | | |
|---|---|---|
| JP | 2003-162397 | 6/2003 |
| JP | 2013-022857 | 2/2013 |

(Continued)

*Primary Examiner* — Saeid Ebrahimi Dehkordy
(74) *Attorney, Agent, or Firm* — Oblon, McClelland, Maier & Neustadt, L.L.P.

(57) ABSTRACT

An information processing system for controlling usage of a service to be provided to a user via a device, obtains information on an amount of resource usage by a server in providing the service, determines whether the amount of resource usage satisfies at least one condition of a plurality of conditions previously set, and when the amount of resource usage is determined to satisfy at least one condition of the plurality of conditions, performs, in accordance with the at least one condition, at least one of a plurality of control operations including a control operation for changing a screen displayed by the device and a control operation for restricting accumulation of the jobs in the second server.

20 Claims, 10 Drawing Sheets

(56) References Cited

U.S. PATENT DOCUMENTS

| | | |
|---|---|---|
| 2014/0337445 A1 | 11/2014 | Nishida |
| 2014/0366104 A1 | 12/2014 | Nishida et al. |
| 2015/0022846 A1 | 1/2015 | Nishida |
| 2015/0022847 A1 | 1/2015 | Nishida |
| 2015/0026340 A1 | 1/2015 | Nishida |
| 2015/0026782 A1 | 1/2015 | Nishida |
| 2015/0029534 A1 | 1/2015 | Nishida et al. |
| 2015/0033293 A1 | 1/2015 | Nishida et al. |
| 2015/0082320 A1 | 3/2015 | Hori et al. |
| 2015/0178024 A1 | 6/2015 | Nishida |
| 2015/0242292 A1* | 8/2015 | Witt .................. H04L 67/00 714/4.11 |
| 2016/0070511 A1 | 3/2016 | Nishida |
| 2016/0098233 A1 | 4/2016 | Nishida |
| 2016/0196096 A1 | 7/2016 | Nishida et al. |
| 2016/0203528 A1* | 7/2016 | Saha .................. G06Q 30/04 705/34 |
| 2018/0203655 A1 | 7/2018 | Nishida et al. |

FOREIGN PATENT DOCUMENTS

| | | |
|---|---|---|
| JP | 2017-511940 | 4/2017 |
| WO | WO2015/138152 A1 | 9/2015 |

* cited by examiner

FIG. 5

| COST CONDI-TION NAME | CONDITION SPECIFICS | DESCRIPTION |
|---|---|---|
| WARNING DISPLAY | $a_2 >$ AMOUNT OF NETWORK USAGE $\geq a_1$ (GB), $b_2 >$ AMOUNT OF HDD USAGE $\geq b_1$ (GB) | NETWORK COST IS 80% OR MORE AND LESS THAN 95% OF UPPER LIMIT, MEMORY COST IS 80% OR MORE AND LESS THAN 95% OF UPPER LIMIT. |
| LOGIN PROHIBITION | AMOUNT OF NETWORK USAGE $\geq a_2$ (GB) | NETWORK COST IS 95% OR MORE OF UPPER LIMIT. |
| ACCUMULATION PROHIBITION | AMOUNT OF HDD USAGE $\geq b_2$ (GB) | MEMORY COST IS 95% OR MORE OF UPPER LIMIT. |
| ... | ... | ... |

DESCRIPTION column: COST CONDITION INFORMATION

1000

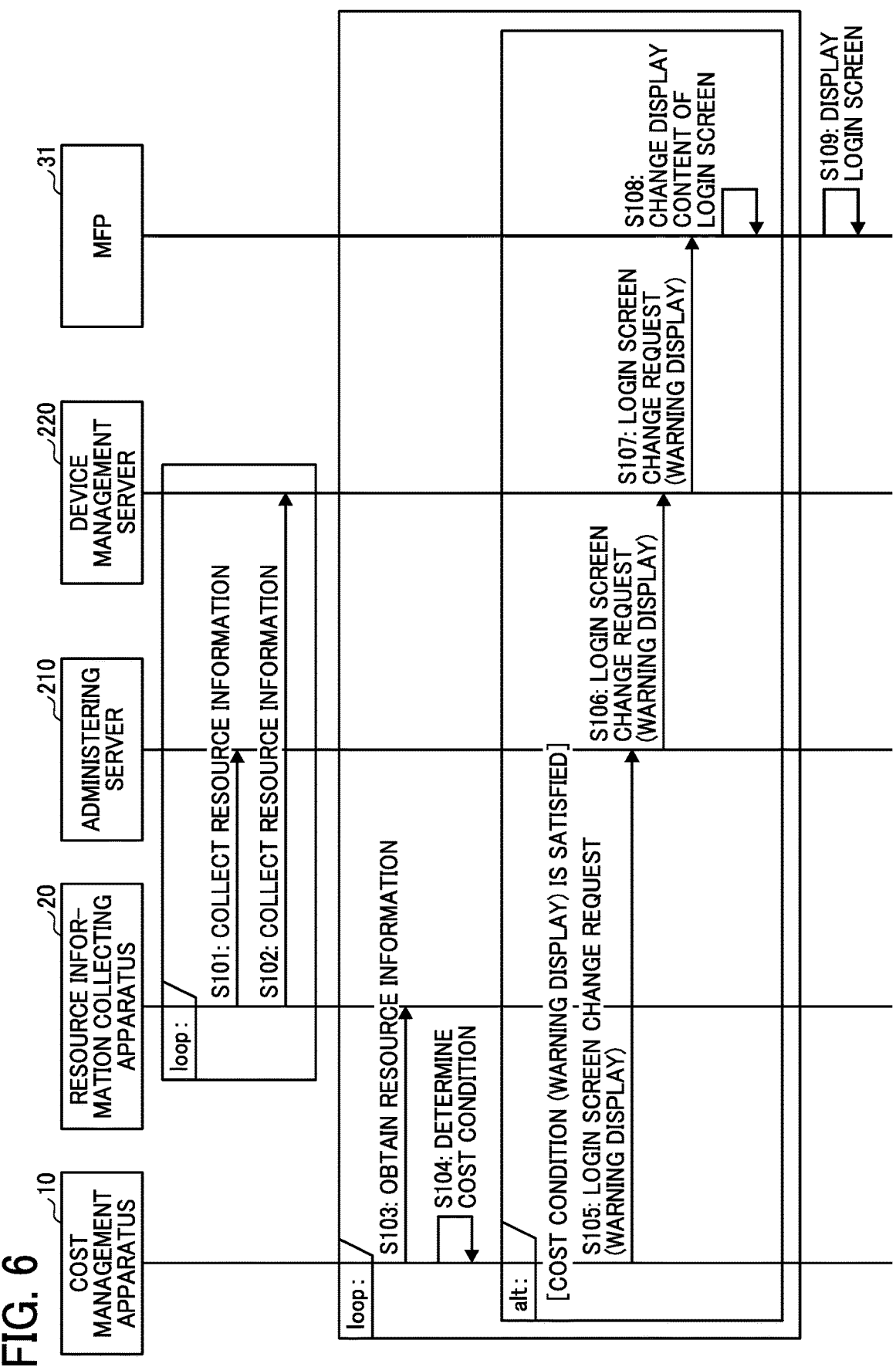

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2018-062095, filed on Mar. 28, 2018, in the Japan Patent Office, the entire disclosure of which is hereby incorporated by reference herein.

BACKGROUND

Technical Field

The present invention relates to an information processing system, an information processing apparatus, and an information processing method.

Description of the Related Art

Currently, a form of service called Infrastructure as a Service (IaaS) in which a virtual machine (VM) instance is provided via a network, such as the Internet, is available. In some cases, software is installed in a VM instance that is provided as IaaS to provide some cloud service (for example, a print service in which the VM instance is caused to function as a print server).

For a printer that stores a print job transmitted from a personal computer (PC) in a memory area thereof, a technique for controlling in accordance with free space of the memory area whether to store a new print job in the memory is available.

SUMMARY

Example embodiments include an information processing system including: a first server to control usage of a service to be provided to a user via a device, the first server including first processing circuitry, and a second server to accumulate one or more jobs relating to the service, the second server including second processing circuitry. The first processing circuitry and the second processing circuitry are to operate in cooperation with each other to: obtain information on an amount of resource usage by the second server in providing the service; determine whether the amount of resource usage satisfies at least one condition of a plurality of conditions previously set; and when the amount of resource usage is determined to satisfy at least one condition of the plurality of conditions, perform, in accordance with the at least one condition, at least one of a plurality of control operations, the control operations including: a control operation for changing a screen displayed by the device; and a control operation for restricting accumulation of the jobs in the second server.

Example embodiments include an information processing apparatus including processing circuitry to: obtain information on an amount of resource usage by a device management server in providing a service to a user via a device, the device management server being configured to accumulate one or more jobs relating to the service; determine whether the amount of resource usage satisfies at least one condition of a plurality of conditions previously set; and when the amount of resource usage is determined to satisfy at least one condition of the plurality of conditions, perform, in accordance with the at least one condition, at least one of a plurality of control operations, the control operations including: a control operation for changing a screen displayed by the device; and a control operation for restricting accumulation of the jobs in the device management server.

Example embodiments include an information processing method performed by the information processing apparatus, and a recording medium storing a control program for causing the information processing apparatus to perform the information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of a cost condition information table;

FIG. 6 is a sequence chart illustrating an example overall process that is performed in the cost management system when changing a login screen;

Figure 1:
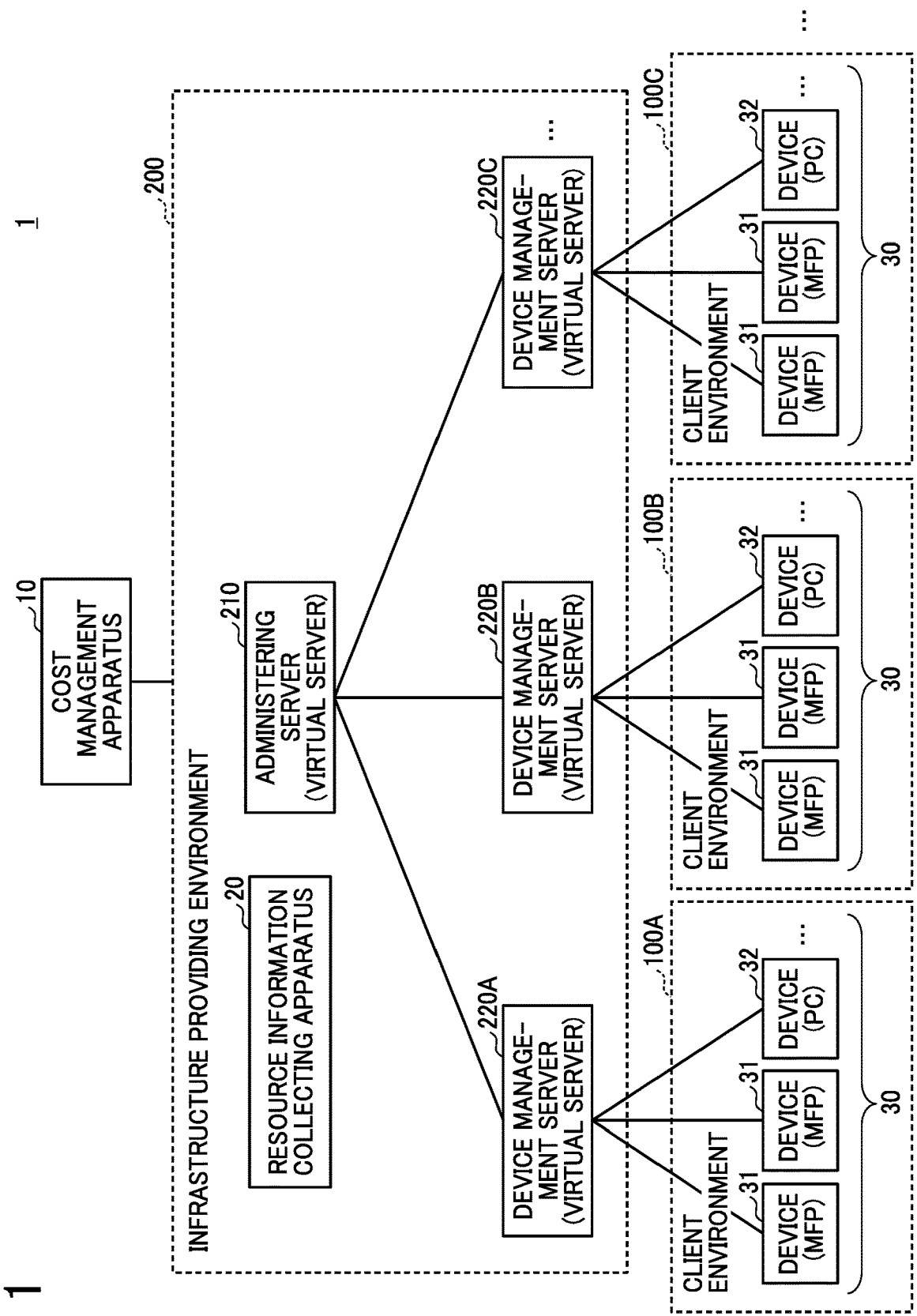
FIG. 1 is a diagram illustrating an example overall configuration of a cost management system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In a case of causing a VM instance to function as a print server and accumulating a print job in the print server, a charge may be incurred in accordance with the amount of resource usage (for example, the amount of hard disk drive (HDD) usage, the amount of network usage, etc.) by the VM instance. Accordingly, depending on the amount of resource usage by the print server, the charge may increase and exceed a budget (the upper limit of the charge).

In an embodiment described below, a description is given of a cost management system with which a situation where the charge incurred in accordance with the amount of resource usage exceeds the upper limit can be prevented.

An embodiment of the present invention (hereinafter referred to as "this embodiment") is described in detail below with reference to the drawings. In this embodiment, a description is given of a cost management system 1 that, in a case of installing software in a VM instance and providing some cloud service (hereinafter referred to as "user service"), manages the cost (charge) of the VM instance so as not to exceed an upper limit. It is assumed that the cost (charge) of the VM instance is incurred in accordance with the amount of resource usage (for example, the amount of HDD usage, the amount of network usage, etc.). Note that the amount of charge for the amount of resource usage, the charging method, etc. differ depending on the provider (infrastructure provider) that provides virtual servers as IaaS.

A VM instance is also simply called "VM" or "virtual machine". Specifically, a virtual machine that is caused to function as some server (for example, a print server) is called "virtual server". It is assumed hereinafter that a VM instance is caused to function as some server, and a description is given while using the term "virtual server".

Overall Configuration

First, the overall configuration of the cost management system 1 according to this embodiment is described with reference to FIG. 1. FIG. 1 is a diagram illustrating an example overall configuration of the cost management system 1 according to this embodiment.

As illustrated in FIG. 1, the cost management system 1 according to this embodiment includes a cost management apparatus 10 and devices 30. The cost management apparatus 10 and the devices 30 are connected to each other via an infrastructure providing environment 200 and a network so as to enable communication therebetween.

The infrastructure providing environment 200 includes a resource information collecting apparatus 20, an administering server 210, and a device management server 220. The resource information collecting apparatus 20 collects information (hereinafter referred to as "resource information") that indicates the amount of resource usage by a virtual server. The administering server 210 and the device management server 220 are servers (virtual servers) that are used when user services are used by using the devices 30.

The administering server 210 is, for example, a virtual server that is configured for each client that owns the devices 30, and manages at least one device management server 220 that is configured for the client. The device management server 220 is, for example, a virtual server that is configured for each client environment 100 in which the devices 30 are installed, manages the devices 30 that allow the user to use user services, and performs processing for implementing the user services in cooperation with the devices 30. The client is a company, an organization, etc. that uses user service.

For example, it is assumed that, as the client environments 100 of a certain client, a client environment 100A, a client environment 100B, and a client environment 100C exist. These client environments 100 are, for example, the client environment 100A, which is a system environment in the New York headquarters, the client environment 100B, which is a system environment in the Newark branch, and the client environment 100C, which is a system environment in the San Francisco branch. In this case, for example, a device management server 220A that manages the devices 30 installed in the client environment 100A, a device management server 220B that manages the devices 30 installed in the client environment 100B, and a device management server 220C that manages the devices 30 installed in the client environment 100C are configured in the infrastructure providing environment 200. Accordingly, for each client environment 100, the device management server 220 that manages the devices 30 installed in the client environment 100 is configured.

However, in a case where, for example, a plurality of client environments 100 are geographically close to each other, one device management server 220 that manages the devices 30 installed in each of the plurality of client environments 100 may be configured. For example, one device management server 220 that manages the devices 30 installed in the client environment 100A, which is the system environment of the New York headquarters, and the devices 30 installed in the client environment 100B, which is the system environment of the Newark branch, may be configured.

The geographical location (for example, the state, the prefecture, or the city) of each client environment 100 in which the devices 30 are installed is also called "site". For example, in the case where the client environment 100A is the system environment in the New York headquarters, the site of the client environment 100A is "New York".

The cost management apparatus 10 manages, for each client, costs incurred in accordance with the amount of resource usage by the virtual servers so as not to exceed a predetermined upper limit. Specifically, in a case where a client uses a user service, a charge (cost) is incurred in accordance with the amount of resource usage (for example, the amount of HDD usage, the amount of network usage, etc.) by the administering server 210 and the device management server 220 (virtual servers). Therefore, the cost management apparatus 10 manages the cost so as not to exceed a predetermined upper limit (for example, a monthly budget for user services used by the client). Accordingly, in a case where a client uses user services, it is possible to prevent a situation where costs incurred in accordance with the amount of resource usage by the virtual servers (the administering server 210 and the device management server 220) exceed the upper limit.

The devices 30 are various electronic devices that allow the user to user services. Examples of the devices 30 include an image forming apparatus, such as a multifunction peripheral (MFP), and a PC. Hereinafter, the device 30 that is an MFP is referred to as "MFP 31", and the device 30 that is a PC is referred to as "PC 32". In addition to an MFP and a PC, examples of the devices 30 may include a printer, a scanner, an electronic whiteboard, a projector, a digital signage apparatus, a smartphone, and a tablet terminal.

The configuration of the cost management system 1 illustrated in FIG. 1 is an example, and another configuration may be employed. For example, the cost management apparatus 10 may be included in the client environment 100. The administering server 210 need not be used depending on the specifics of the user service or the method of implementing the user service. In this case, the administering server 210 need not be configured in the infrastructure providing environment 200.

This embodiment assumes that a service provider that provides user services is a provider different from an infrastructure provider that provides the virtual servers by providing the infrastructure providing environment 200; however, the providers need not be different providers and may be the same provider. A contract with the infrastructure provider for configuring the virtual servers (contract for the usage of the virtual servers) may be made by the client or by the service provider that provides the user services.

Specific Examples of User Services

A specific example of the user services is "print service" in which the device management server 220 is caused to function as a server that accumulates a print job. In this case, for example, a print job created by the PC 32 is accumulated in the device management server 220. Then, the MFP 31 obtains the print job from the device management server 220 and executes the print job to perform printing. Accordingly, the print service is provided to the user of the PC 32.

Another specific example of the user services is "scan delivery service" in which the device management server 220 is caused to function as a server that delivers a scan image to a particular destination. In this case, for example, a scan image created by the MFP 31 scanning a document is transmitted to the device management server 220. Then, the device management server 220 delivers the scan image to a particular destination. Accordingly, the scan delivery service is provided to the user of the MFP 31. In the scan delivery service, the device management server 220 may perform some process (for example, an optical character recognition (OCR) process) for the scan image, and thereafter, deliver data obtained as a result of the process to the particular destination.

As described above, the device 30 and the device management server 220 that manages the device 30 cooperate with each other to perform processing, thereby implementing the user service. A description is given below under the assumption that, for example, the user service is "print service". In a case where the user service is "print service", the amount of resource usage by the virtual servers includes the amount of HDD usage for a print job accumulated in the device management server 220 and the amount of network usage for the print job transmitted and received by the device management server 220.

Hardware Configuration

Next, the hardware configuration of the cost management apparatus 10, the resource information collecting apparatus 20, and the PC 32 according to this embodiment is described.

Figure 2:
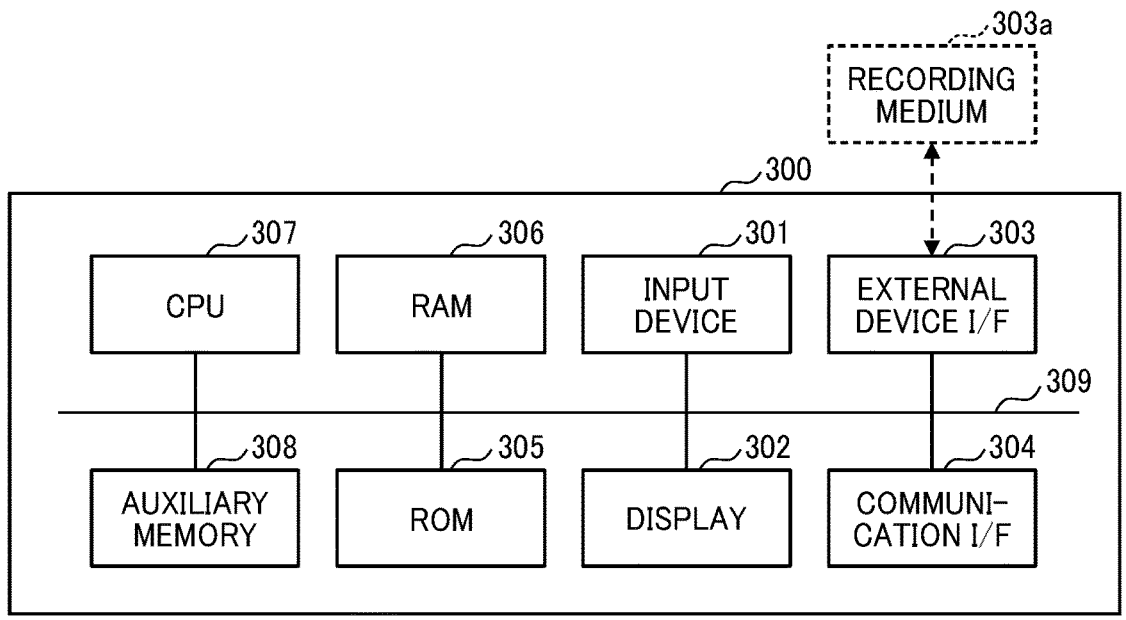
FIG. 2 is a diagram illustrating an example hardware configuration of a computer.

The cost management apparatus 10, the resource information collecting apparatus 20, and the PC 32 according to this embodiment can each be implemented by using, for example, at least one computer 300 illustrated in FIG. 2. FIG. 2 is a diagram illustrating an example hardware configuration of the computer 300.

The computer 300 illustrated in FIG. 2 includes an input device 301, a display 302, an external device interface (I/F) 303, and a communication I/F 304. The computer 300 illustrated in FIG. 2 further includes a read-only memory (ROM) 305, a random access memory (RAM) 306, a central processing unit (CPU) 307, and an auxiliary memory 308. These hardware units are connected to each other via a bus 309.

The input device 301 is, for example, a keyboard, a mouse, or a touch panel and is used by the user to input various operations. The display 302 displays the result of processing by the computer 300. The computer 300 that is used to implement each of the cost management apparatus 10 and the resource information collecting apparatus 20 need not include at least one of the input device 301 and the display 302.

The external device I/F 303 is an interface with external devices. The external devices include a recording medium 303a. The computer 300 can perform, for example, reading from and writing to the recording medium 303a via the external device I/F 303. Examples of the recording medium 303a include a universal serial bus (USB) memory, an SD memory card, a floppy disk, a compact disk (CD), and a digital versatile disk (DVD).

The communication I/F 304 is an interface for connecting the computer 300 to a network. The computer 300 can communicate with other devices, etc. via the communication I/F 304.

The ROM 305 is a nonvolatile semiconductor memory that can retain programs and data even after the power is turned off. In the ROM 305, for example, programs, such as a basic input/output system (BIOS) that is executed when the computer 300 is started up, operating system (OS) settings, and network settings, and data are stored. The RAM 306 is a volatile semiconductor memory that temporarily retains programs and data.

The CPU 307 is an arithmetic unit that loads programs and data from the ROM 305, the auxiliary memory 308, etc. to the RAM 306 and performs processing to thereby control the computer 300 as a whole and implement functions.

The auxiliary memory 308 is, for example, an HDD or a solid state drive (SSD) and is a nonvolatile memory that stores programs and data. The programs and data stored in the auxiliary memory 308 include an OS, which is basic software for controlling the computer 300 as a whole, application programs for providing various functions on the OS, and one or more programs for implementing this embodiment. The auxiliary memory 308 manages the programs and data stored therein by using a particular file system and database (DB).

With the hardware configuration of the computer 300 illustrated in FIG. 2, the cost management apparatus 10, the resource information collecting apparatus 20, and the PC 32 according to this embodiment can implement various processes. The administering server 210 and the device management server 220 (to be more precise, physical servers used to implement the administering server 210 and the device management server 220) are also implemented with the hardware configuration of the computer 300 illustrated in FIG. 2.

Figure 3:
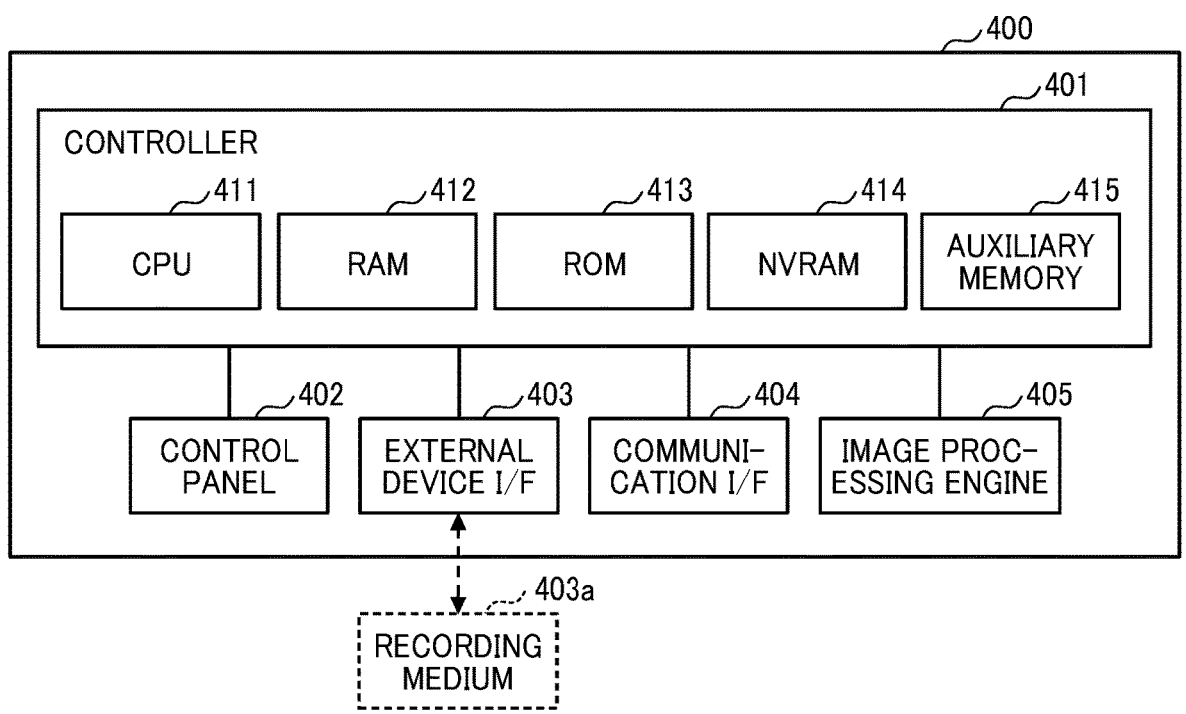
FIG. 3 is a diagram illustrating an example hardware configuration of an image forming apparatus.

Next, the hardware configuration of the MFP 31 according to this embodiment is described. The MFP 31 according to this embodiment can be implemented by using, for example, an image forming apparatus 400 illustrated in FIG. 3. FIG. 3 is a diagram illustrating an example hardware configuration of the image forming apparatus 400.

The image forming apparatus 400 illustrated in FIG. 3 includes a controller 401, a control panel 402, an external device IN 403, a communication I/F 404, and an image processing engine 405. The controller 401 includes a CPU 411, a RAM 412, a ROM 413, a nonvolatile random access memory (NVRAM) 414, and an auxiliary memory 415.

The ROM 413 is a nonvolatile semiconductor memory that can retain programs and data even after the power is turned off. The RAM 412 is a volatile semiconductor memory that temporarily retains programs and data. The NVRAM 414 is a nonvolatile semiconductor memory that stores, for example, setting information. The auxiliary memory 415 is, for example, an HDD or an SSD and is a nonvolatile memory that stores programs and data.

The CPU 411 is an arithmetic unit that loads programs, data, setting information, etc. from the ROM 413, the NVRAM 414, the auxiliary memory 415, etc. to the RAM 412 and performs processing to thereby control the image forming apparatus 400 as a whole and implement functions.

The control panel 402 is an input/output device that includes an input unit for accepting user input and a display unit for display. The external device I/F 403 is an interface with external devices. The external devices include a recording medium 403a. The image forming apparatus 400 can perform, for example, reading from and writing to the recording medium 403a via the external device I/F 403.

Examples of the recording medium 403a include an integrated circuit (IC) card, a USB memory, an SD memory card, a floppy disk, a CD, and a DVD.

The communication I/F 404 is an interface for connecting the image forming apparatus 400 to a network. The image forming apparatus 400 can communicate with other devices, etc. via the communication I/F 404.

The image processing engine 405 is, for example, a plotter or a scanner and is a device that performs various types of image processing, such as print processing and scan processing.

With the hardware configuration of the image forming apparatus 400 illustrated in FIG. 3, the MFP 31 according to this embodiment can implement various processes.

Functional Configuration

Figure 4:
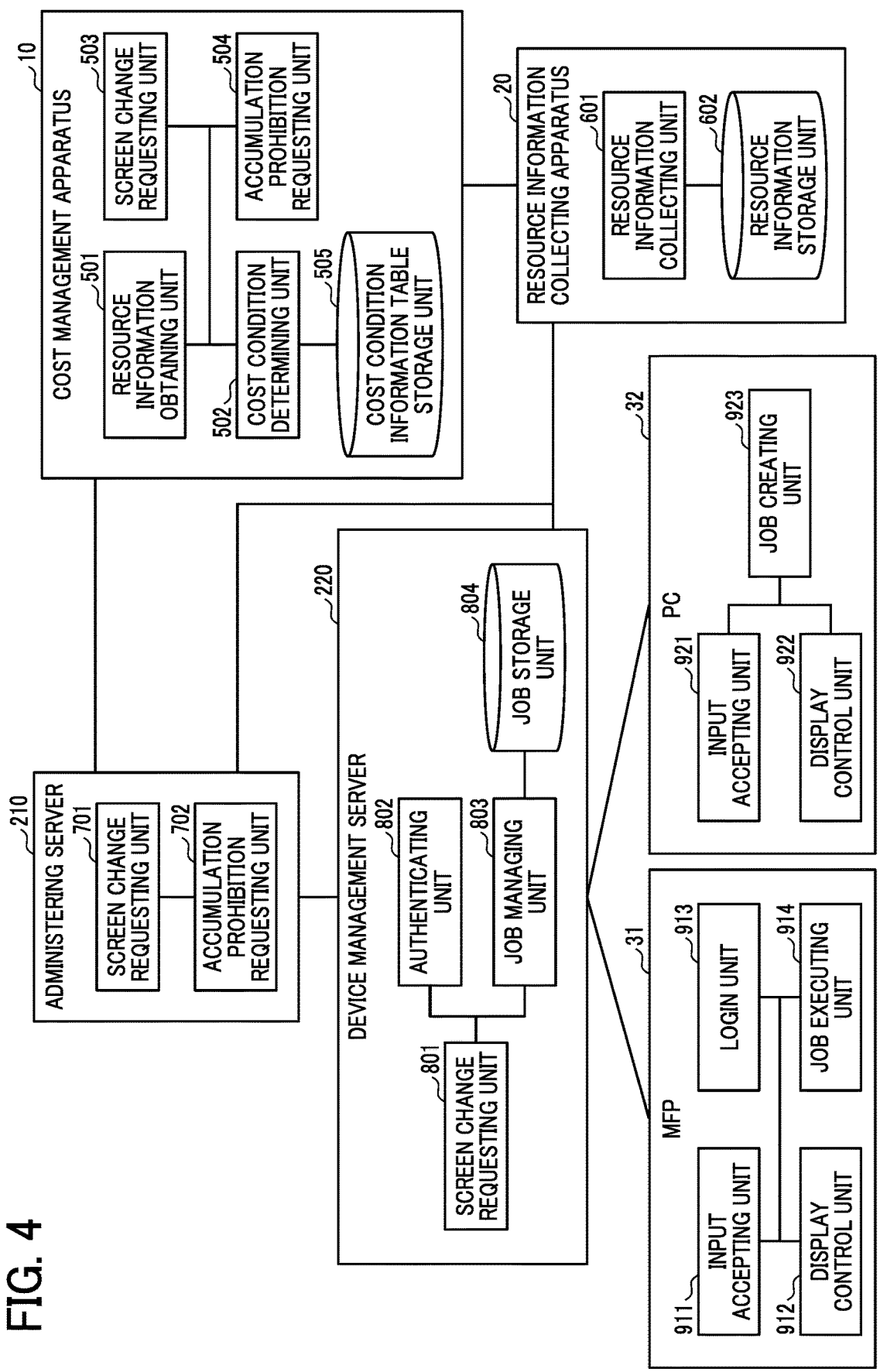
FIG. 4 is a diagram illustrating an example functional configuration of the cost management system according to the embodiment.

Next, the functional configuration of the cost management system 1 according to this embodiment is described with reference to FIG. 4. FIG. 4 is a diagram illustrating an example functional configuration of the cost management system 1 according to this embodiment.

Resource Information Collecting Apparatus

As illustrated in FIG. 4, the resource information collecting apparatus 20 according to this embodiment includes a resource information collecting unit 601. The resource information collecting unit 601 is implemented as a process that is performed by the CPU 307 in accordance with one or more programs installed in the resource information collecting apparatus 20.

The resource information collecting apparatus 20 according to this embodiment further includes a resource information storage unit 602. The resource information storage unit 602 can be implemented by using, for example, the auxiliary memory 308. The resource information storage unit 602 may be implemented by using, for example, a memory that is connected to the resource information collecting apparatus 20 via a network.

The resource information collecting unit 601 collects resource information from the administering server 210 and the device management server 220. Specifically, the resource information collecting unit 601 obtains resource information that indicates the amount of resource usage (for example, the amount of HDD usage, the amount of network usage, etc.) by the administering server 210 and the device management server 220, which are virtual servers, from the administering server 210 and the device management server 220.

Then, the resource information collecting unit 601 stores the resource information obtained from the administering server 210 and the device management server 220 in the resource information storage unit 602. The resource information is thus stored in the resource information storage unit 602, for example, for each virtual server on a time-series basis.

The resource information collecting unit 601 obtains resource information from the administering server 210 and the device management server 220 at predetermined time intervals, such as on a daily basis.

Cost Management Apparatus

As illustrated in FIG. 4, the cost management apparatus 10 according to this embodiment includes a resource information obtaining unit 501, a cost condition determining unit 502, a screen change requesting unit 503, and an accumulation prohibition requesting unit 504. These functional units are implemented as processes that are performed by the CPU 307 in accordance with one or more programs installed in the cost management apparatus 10.

The cost management apparatus 10 according to this embodiment further includes a cost condition information table storage unit 505. The cost condition information table storage unit 505 can be implemented by using, for example, the auxiliary memory 308. The cost condition information table storage unit 505 may be implemented by using, for example, a memory that is connected to the cost management apparatus 10 via a network.

The resource information obtaining unit 501 obtains resource information from the resource information collecting apparatus 20. Specifically, the resource information obtaining unit 501 obtains, for example, the latest piece of resource information about the virtual servers (the administering server 210 and the device management server 220) configured by a client of interest among pieces of resource information stored in the resource information storage unit 602 of the resource information collecting apparatus 20. Accordingly, resource information indicating the current amount of resource usage by the virtual servers configured by the client is obtained.

The resource information obtaining unit 501 obtains resource information from the resource information collecting apparatus 20 at predetermined time intervals, such as on a daily basis.

The cost condition determining unit 502 refers to a cost condition information table 1000 stored in the cost condition information table storage unit 505 to determine whether the resource information obtained by the resource information obtaining unit 501 satisfies a cost condition. The cost condition is a condition for determining the proportion of the cost (charge) of the current amount of resource usage relative to an upper limit and is expressed by, for example, a conditional expression for the current amount of resource usage.

The cost condition information table 1000 stored in the cost condition information table storage unit 505 is described with reference to FIG. 5. FIG. 5 is a diagram illustrating an example of the cost condition information table 1000.

The cost condition information table 1000 as illustrated in FIG. 5 is stored in the cost condition information table storage unit 505. In the cost condition information table storage unit 505, different cost condition information tables 1000 may be stored for respective clients or a common cost condition information table 1000 may be stored for all clients.

In the cost condition information table 1000, one or more pieces of cost condition information indicating respective cost conditions are included. Each of the pieces of cost condition information includes data items of "cost condition name", "cost specifics", and "description".

As "cost condition name", the name of the cost condition is set. As "condition specifics", one or more conditional expressions that express the cost condition are set. As "description", a description of the cost condition is set.

For example, in cost condition information having a cost condition name "warning display", "$a_2$>amount of network usage ≥$a_1$ (gigabytes), $b_2$>amount of HDD usage≥$b_1$ (gigabytes)" is set as "condition specifics". This means that, in a case where "$a_2$>amount of network usage≥$a_1$ (gigabytes)" or "$b_2$>amount of HDD usage≥$b_1$ (gigabytes)" is satisfied, the cost condition having the cost condition name "warning display" is determined to be satisfied.

For example, in the cost condition information having the cost condition name "warning display", "the network cost is 80% or more and less than 95% of the upper limit, the memory cost is 80% or more and less than 95% of the upper limit" is set as "description". This means that, in a case where "$a_2$>amount of network usage≥$a_1$ (gigabytes)" is satisfied, the network cost is 80% or more and less than 95% of the upper limit, and similarly means that, in a case where "$b_2$>amount of HDD usage≥$b_1$ (gigabytes)" is satisfied, the memory cost is 80% or more and less than 95% of the upper limit.

The thresholds ($a_1$ and $a_2$ described above) of the amount of network usage and the thresholds ($b_1$ and $b_2$ described above) of the amount of HDD usage are set to any values by, for example, the client.

Cost condition information having a cost condition name "login prohibition" and cost condition information having a cost condition name "accumulation prohibition" are set in a similar manner. As described above, each piece of cost condition information includes a condition for determining the proportion of the cost (charge) of the current amount of resource usage relative to the upper limit.

The pieces of cost condition information illustrated in FIG. 5 are examples, and cost condition information indicating any cost condition may be included in the cost condition information table 1000. For example, in the examples illustrated in FIG. 5, the four thresholds $a_1$, $a_2$, $b_1$, and $b_2$ are used as the thresholds of the amount of network usage and the amount of HDD usage; however, the number of thresholds is not limited to four, and any number of thresholds may be used. As a conditional expression set as "condition specifics" in cost condition information, any expression may be set. For example, a conditional expression expressed by the sum (or weighted sum) of the amount of network usage and the amount of HDD usage and one or more thresholds may be set.

The screen change requesting unit 503 transmits a request (login screen change request) for changing a login screen to be displayed on the MFP 31 in a case where the cost condition determining unit 502 determines that the cost condition having the cost condition name "warning display" or "login prohibition" is satisfied.

More specifically, in a case where it is determined that the cost condition having the cost condition name "warning display" is satisfied, the screen change requesting unit 503 transmits to the administering server 210 a request for displaying on the login screen a warning indicating that the cost (charge) reaches a predetermined threshold (for example, 80% of the upper limit). Accordingly, it is expected that a login to the MFP 31 can be suppressed and that an increase in the network cost that is incurred when the MFP 31 obtains a print job from the device management server 220 can be suppressed. As a login to the MFP 31 is suppressed, it is also expected that an increase in the memory cost that is incurred when the PC 32 accumulates a print job in the device management server 220 can be suppressed.

Meanwhile, in a case where it is determined that the cost condition having the cost condition name "login prohibition" is satisfied, the screen change requesting unit 503 transmits to the administering server 210 a request for prohibiting a login on the login screen. Accordingly, a login to the MFP 31 is prohibited, and an increase in the network cost that is incurred when the MFP 31 obtains a print job from the device management server 220 can be prevented. A login on the login screen can be prohibited by disabling or hiding a login button displayed on the login screen.

In a case where the cost condition determining unit 502 determines that the cost condition having the cost condition name "accumulation prohibition" is satisfied, the accumulation prohibition requesting unit 504 transmits to the administering server 210 a request (job accumulation prohibition request) for prohibiting accumulation of a print job in the device management server 220. Accordingly, accumulation of a print job in the device management servers 220 by the PC 32 is prohibited, and an increase in the memory cost that is incurred when a print job is accumulated can be prevented.

Administering Server

As illustrated in FIG. 4, the administering server 210 according to this embodiment includes a screen change requesting unit 701 and an accumulation prohibition requesting unit 702. These functional units are implemented as processes that are performed by the CPU 307 in accordance with one or more programs installed in the administering server 210.

The screen change requesting unit 701 transmits a request (login screen change request) received from the cost management apparatus 10 to the device management server 220 managed by the administering server 210.

The accumulation prohibition requesting unit 702 transmits a request (job accumulation prohibition request) received from the cost management apparatus 10 to the device management server 220 managed by the administering server 210.

Device Management Server

As illustrated in FIG. 4, the device management server 220 according to this embodiment includes a screen change requesting unit 801, an authenticating unit 802, and a job managing unit 803. These functional units are implemented as processes that are performed by the CPU 307 in accordance with one or more programs installed in the device management server 220.

The device management server 220 according to this embodiment further includes a job storage unit 804. The job storage unit 804 can be implemented by using, for example, the auxiliary memory 308. The job storage unit 804 may be implemented by using, for example, a memory that is connected to a physical server in which the device management server 220 is configured, via a network.

The screen change requesting unit 801 transmits a request (login screen change request) received from the administering server 210 to the MFP 31 managed by the device management server 220. The authenticating unit 802 performs an authentication process in response to a login request from the MFP 31.

The job managing unit 803 stores (accumulates) a print job received from the PC 32 in the job storage unit 804. In a case where the authentication process performed by the authenticating unit 802 is successfully completed, the job managing unit 803 transmits to the MFP 31 a list (job list) of print jobs that can be executed for the user for which the authentication process is successfully completed among print jobs stored in the job storage unit 804. In a case of receiving a job accumulation prohibition request from the administering server 210, the job managing unit 803 prohibits accumulation of a print job in the job storage unit 804.

MFP

As illustrated in FIG. 4, the MFP 31 according to this embodiment includes an input accepting unit 911, a display control unit 912, a login unit 913, and a job executing unit 914. These functional units are implemented as processes that are performed by the CPU 411 in accordance with one or more programs installed in the MFP 31.

The input accepting unit 911 accepts input of various operations (for example, a login operation and a job execution operation) performed by the user. The display control unit 912 displays various screens (for example, the login screen and a job list screen).

The display control unit 912 changes the display content of the login screen in accordance with a request (login screen change request) from the device management server 220. Specifically, for example, the display control unit 912 displays a warning on the login screen, or disables or hides the login button on the login screen in accordance with the login screen change request.

In a case where the input accepting unit 911 accepts input of a login operation, the login unit 913 transmits a login request to the device management server 220.

In a case where the input accepting unit 911 accepts input of a job execution operation, the job executing unit 914 executes a print job corresponding to the job execution operation. When the print job is executed, print target data included in the print job is printed on a print medium, such as a sheet of paper.

PC

As illustrated in FIG. 4, the PC 32 according to this embodiment includes an input accepting unit 921, a display control unit 922, and a job creating unit 923. These functional units are implemented as processes that are performed by the CPU 307 in accordance with one or more programs installed in the PC 32.

The input accepting unit 921 accepts input of various operations (for example, a job creation operation) performed by the user. The display control unit 922 displays various screens.

The job creating unit 923 creates a print job in a case where the input accepting unit 911 accepts input of a job creation operation.

Details of Processing

Next, the details of processing performed in the cost management system 1 according to this embodiment are described.

Overall Process that is Performed in Case of Changing Login Screen

Hereinafter, a process that is performed in a case of displaying on the login screen of the MFP 31 a warning indicating that the cost (charge) of the virtual servers (the administering server 210 and the device management server 220) reaches a predetermined threshold (for example, 80% of the upper limit) is described with reference to FIG. 6. FIG. 6 is a sequence chart illustrating an example overall process that is performed in the cost management system 1 in the case of changing the login screen.

The resource information collecting unit 601 of the resource information collecting apparatus 20 collects resource information from the administering server 210 and the device management server 220 (step S101 and step S102). The resource information collecting unit 601 stores the resource information collected from the administering server 210 and the device management server 220 in the resource information storage unit 602. The resource information collecting unit 601 collects resource information from the administering server 210 and the device management server 220 at predetermined time intervals, such as on a daily basis.

In the subsequent process from step S103 to step S109, a case of managing costs (charges) relating to virtual servers (the administering server 210 and the device management server 220) configured by a certain client is described.

The resource information obtaining unit 501 of the cost management apparatus 10 obtains resource information from the resource information collecting apparatus 20 (step S103). Specifically, among pieces of resource information stored in the resource information storage unit 602 of the resource information collecting apparatus 20, the resource information obtaining unit 501 obtains the latest piece of resource information about the virtual servers (the administering server 210 and the device management server 220) that are used when the client uses a user service.

The resource information obtaining unit 501 obtains resource information from the resource information collecting apparatus 20 at predetermined time intervals, such as on a daily basis. Therefore, the subsequent process in step S104 is also performed at the predetermined time intervals.

Next, the cost condition determining unit 502 of the cost management apparatus 10 refers to the cost condition information table 1000 stored in the cost condition information table storage unit 505 to determine whether the resource information obtained by the resource information obtaining unit 501 satisfies a cost condition (step S104).

It is assumed here that, among the pieces of cost condition information illustrated in FIG. 5, the cost condition indicated by the piece of cost condition information having the cost condition name "warning display" is determined to be satisfied, and a description is further given. Specifically, it is assumed that the amount of network usage indicated by the resource information obtained in step S103 described above is determined to be $a_1$ or more and less than $a_2$ or the amount of HDD usage indicated by the resource information is determined to be $b_1$ or more and less than $b_2$.

In this case, the screen change requesting unit 503 of the cost management apparatus 10 transmits a login screen change request to the administering server 210 that is used when the client uses a user service (step S105). At this time, the cost management apparatus 10 transmits, for example, a login screen change request in which the cost condition name "warning display" is specified.

In a case where the administering server 210 is not configured, the screen change requesting unit 503 needs to transmit a login screen change request to the device management server 220 that is used when the client uses a user service. Alternatively, the screen change requesting unit 503 may transmit a login screen change request to each MFP 31 managed by the device management server 220 that is used when the client uses a user service.

Next, the screen change requesting unit 701 of the administering server 210 transmits the login screen change request to the device management server 220 managed by the administering server 210 (step S106).

For example, in the case where the device management server 220A, the device management server 220B, and the device management server 220C exist as the device management servers 220 that are used when the client uses a user service, the screen change requesting unit 701 transmits the login screen change request to each of the device management server 220A, the device management server 220B, and the device management server 220C.

Next, the screen change requesting unit 801 of each device management server 220 transmits the login screen change request to the MFP 31 managed by the device management server 220 (step S107).

When the login screen change request is received, the display control unit 912 of each MFP 31 changes the display content of the login screen in accordance with the change request (step S108). Specifically, at this time, the display control unit 912 changes the display content of the login screen so as to display a predetermined warning (a warning indicating that the cost (charge) reaches a predetermined threshold (for example, 80% of the upper limit) on the login screen.

Figure 7:
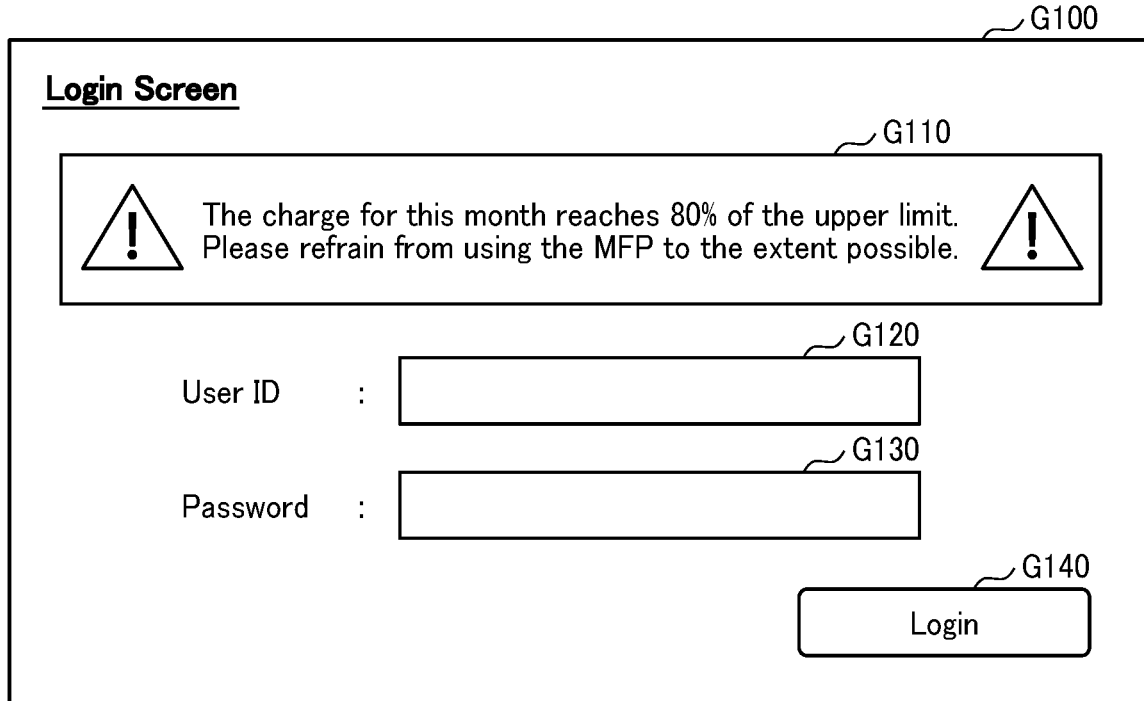
FIG. 7 is a diagram illustrating an example of the login screen.

Then, the display control unit 912 of each MFP 31 displays, for example, a login screen G100 illustrated in FIG. 7 on the control panel 402 in response to a particular operation (for example, an operation for displaying the login screen) performed by the user (step S109). The login screen G100 illustrated in FIG. 7 is a login screen displayed after the display content has been changed in step S107 described above and includes a waring display field G110, a user ID input field G120, a password input field G130, and a login button G140.

In the waring display field G110, for example, a message for urging the user to refrain from using the MFP because the cost (charge) reaches a predetermined threshold (for example, 80% of the upper limit) is displayed. Accordingly, it is possible to urge the user of the MFP 31 to refrain from logging in to the MFP 31. Consequently, it is expected that a situation where, for example, a print job is obtained from the device management server 220 in response to the use of the MFP 31 and the network cost further increases can be suppressed. With this, it is possible to suppress accumulation of a print job in the device management server 220 by the PC 32, and it is expected that a situation where the memory cost further increases can be suppressed.

The user ID input field G120 and the password input field G130 are input fields into which a user ID and a password for the user to log in to the MFP 31 are input. When the user inputs their user ID and password into the user ID input field G120 and the password input field G130 respectively and presses the login button G140, the user can log in to the MFP 31. As described above, even when the warning is displayed in the waring display field G110, the user can log in to the MFP 31.

The case where the user inputs their user ID and password on the login screen G100 illustrated in FIG. 7 to log in to the MFP 31 has been described; however, the login method is not limited to this. The user can log in to the MFP 31 by, for example, holding an IC card or the like over a particular place of the MFP 31.

The change in step S108 described above needs to be cancelled at a predetermined timing (for example, at the beginning of the month). Accordingly, the original login screen in which the waring display field G110 is not included is displayed at the timing of, for example, the beginning of the month.

Another Overall Process that is Performed in Case of Changing Login Screen

Figure 8:
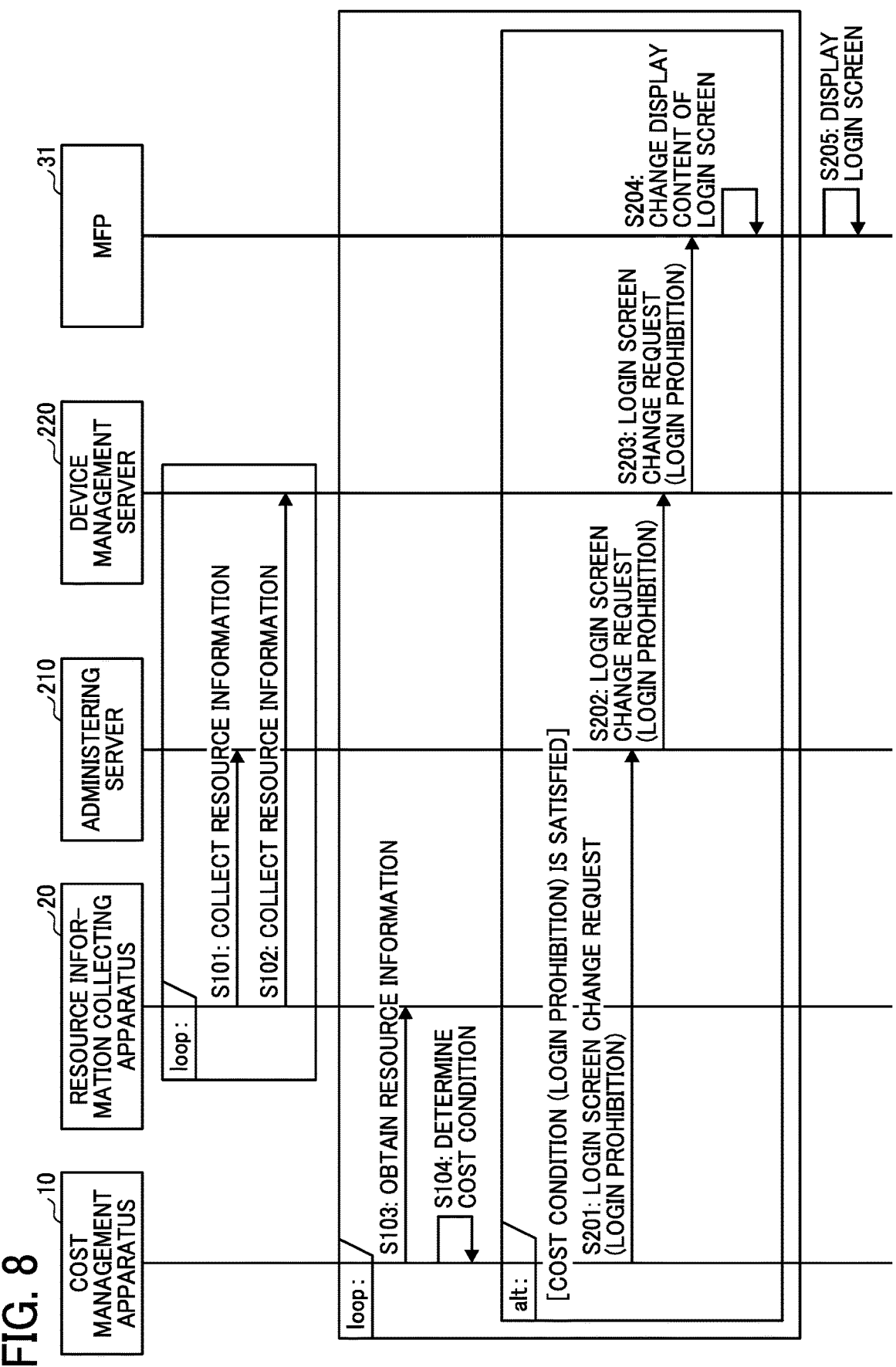
FIG. 8 is a sequence chart illustrating an example overall process that is performed in the cost management system when changing the login screen.

Hereinafter, a process for disabling or hiding the login button on the login screen that is performed in a case where, among the costs of the virtual servers (the administering server 210 and the device management server 220), the network cost reaches a predetermined threshold (for example, 95% of the upper limit) is described with reference to FIG. 8. FIG. 8 is a sequence chart illustrating an example overall process that is performed in the cost management system 1 in the case of changing the login screen. The process from step S101 to step S104 in FIG. 8 is the same as that in FIG. 6, and therefore, a description thereof is omitted.

A case is described where it is determined in step S104 in FIG. 8 that, among the pieces of cost condition information illustrated in FIG. 5, the cost condition indicated by the piece of cost condition information having the cost condition name "login prohibition" is satisfied.

In this case, the screen change requesting unit 503 of the cost management apparatus 10 transmits a login screen change request to the administering server 210 that is used when the client uses a user service (step S201). At this time, the cost management apparatus 10 transmits, for example, a login screen change request in which the cost condition name "login prohibition" is specified.

In the case where the administering server 210 is not configured, the screen change requesting unit 503 needs to transmit a login screen change request to the device management server 220 that is used when the client uses a user service. Alternatively, the screen change requesting unit 503 may transmit a login screen change request to each MFP 31 managed by the device management server 220 that is used when the client uses a user service.

Next, the screen change requesting unit 701 of the administering server 210 transmits the login screen change request to the device management server 220 managed by the administering server 210 (step S202).

Next, the screen change requesting unit 801 of each device management server 220 transmits the login screen change request to the MFP 31 managed by the device management server 220 (step S203).

When the login screen change request is received, the display control unit 912 of each MFP 31 changes the display content of the login screen in accordance with the change request (step S204). Specifically, at this time, the display control unit 912 changes the display content of the login screen so as not to allow the user to perform a login.

Figure 9:
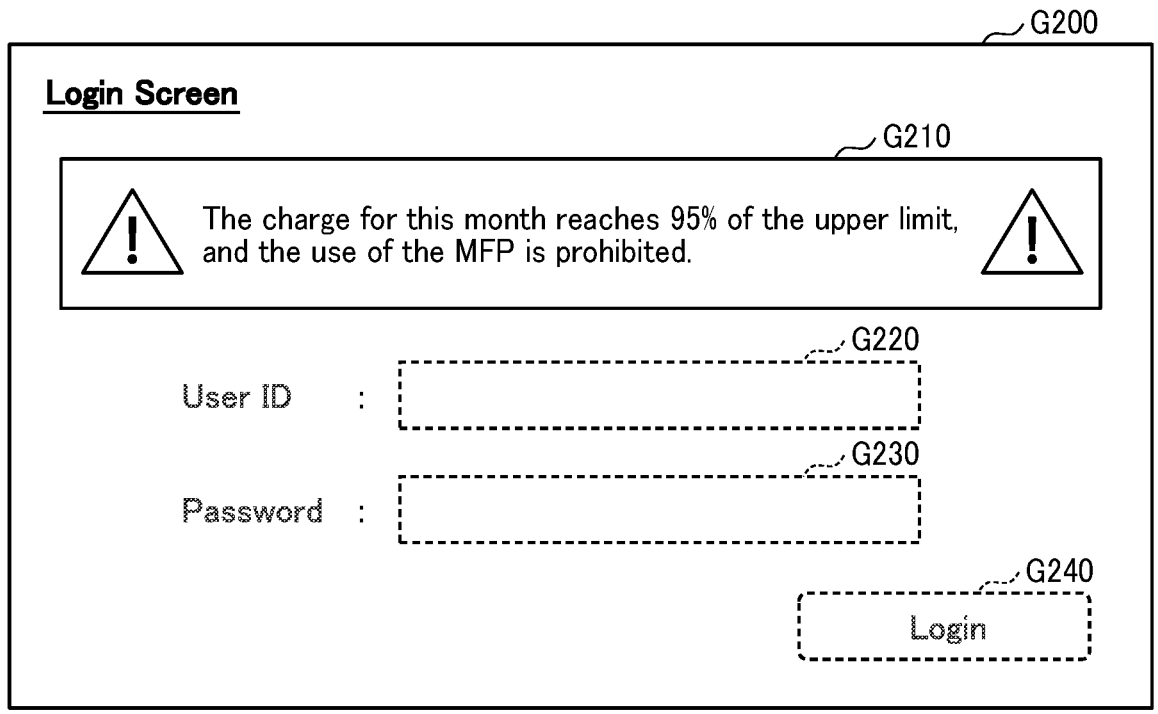
FIG. 9 is a diagram illustrating an example of the login screen.

Then, the display control unit 912 of each MFP 31 displays, for example, a login screen G200 illustrated in FIG. 9 on the control panel 402 in response to a particular operation (for example, an operation for displaying the login screen) performed by the user (step S205). The login screen G200 illustrated in FIG. 9 is a login screen displayed after the display content has been changed in step S204 described above and includes a login prohibition display field G210, a user ID input field G220, a password input field G230, and a login button G240.

In the login prohibition display field G210, for example, a message stating that the use of the MFP is prohibited because the cost (charge) reaches a predetermined threshold (for example, 95% of the upper limit) is displayed. The user ID input field G220 and the password input field G230 are disabled so that the user is unable to input their user ID and password, and the login button G240 is disabled so that the user is unable to press the login button G240. Accordingly, it is possible to prohibit the user from logging in to the MFP 31. Consequently, it is possible to prevent a situation where, for example, a print job is obtained from the device management server 220 in response to the use of the MFP 31 and the network cost further increases. With this, it is possible to suppress accumulation of a print job in the device management server 220 by the PC 32, and it is expected that a situation where the memory cost further increases can be suppressed.

As described above, when a login to the MFP 31 is prohibited, for example, it is possible to prevent a situation where, among the costs (charges) of the virtual servers, the network cost exceeds a predetermined budget.

On the login screen G200 illustrated in FIG. 9, the user ID input field G220 and the password input field G230 are disabled so that the user is unable to input their user ID and password, and the login button G240 is disabled so that the user is unable to press the login button G240; however this configuration need not be employed. For example, only the login button G240 may be disabled so that the user is unable to press the login button G240, or the login button G240 may be hidden. The user ID input field G220 and the password input field G230 may be hidden. Alternatively, the user may be allowed to press the login button G240, and an error message or the like may be displayed when the login button G240 is pressed to thereby disable the login.

However, for example, the user may want to perform printing even if the cost exceeds the budget, and therefore, for example, the administrator of the MFP 31 or a person who receives permission from the administrator may be allowed to log in to the MFP 31.

The change in step S204 described above needs to be cancelled at a predetermined timing (for example, at the beginning of the month). Consequently, the user is allowed to log in to the MFP 31 at the timing of, for example, the beginning of the month.

Figure 10A:
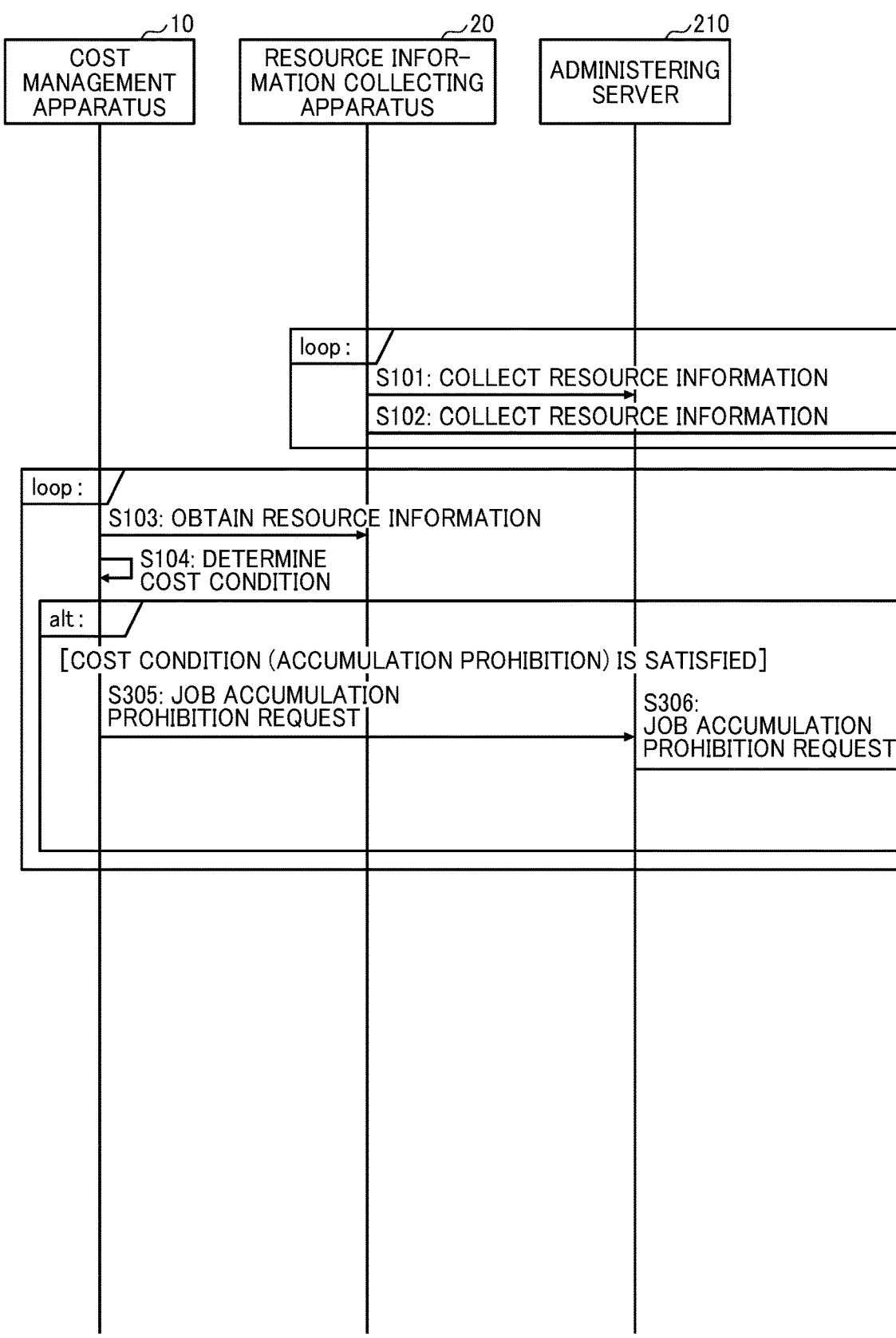
FIGS. 10A and 10B (FIG. 10) are a sequence diagram illustrating an example overall process that is performed in the cost management system when prohibiting accumulation of a job.
Figure 10B:
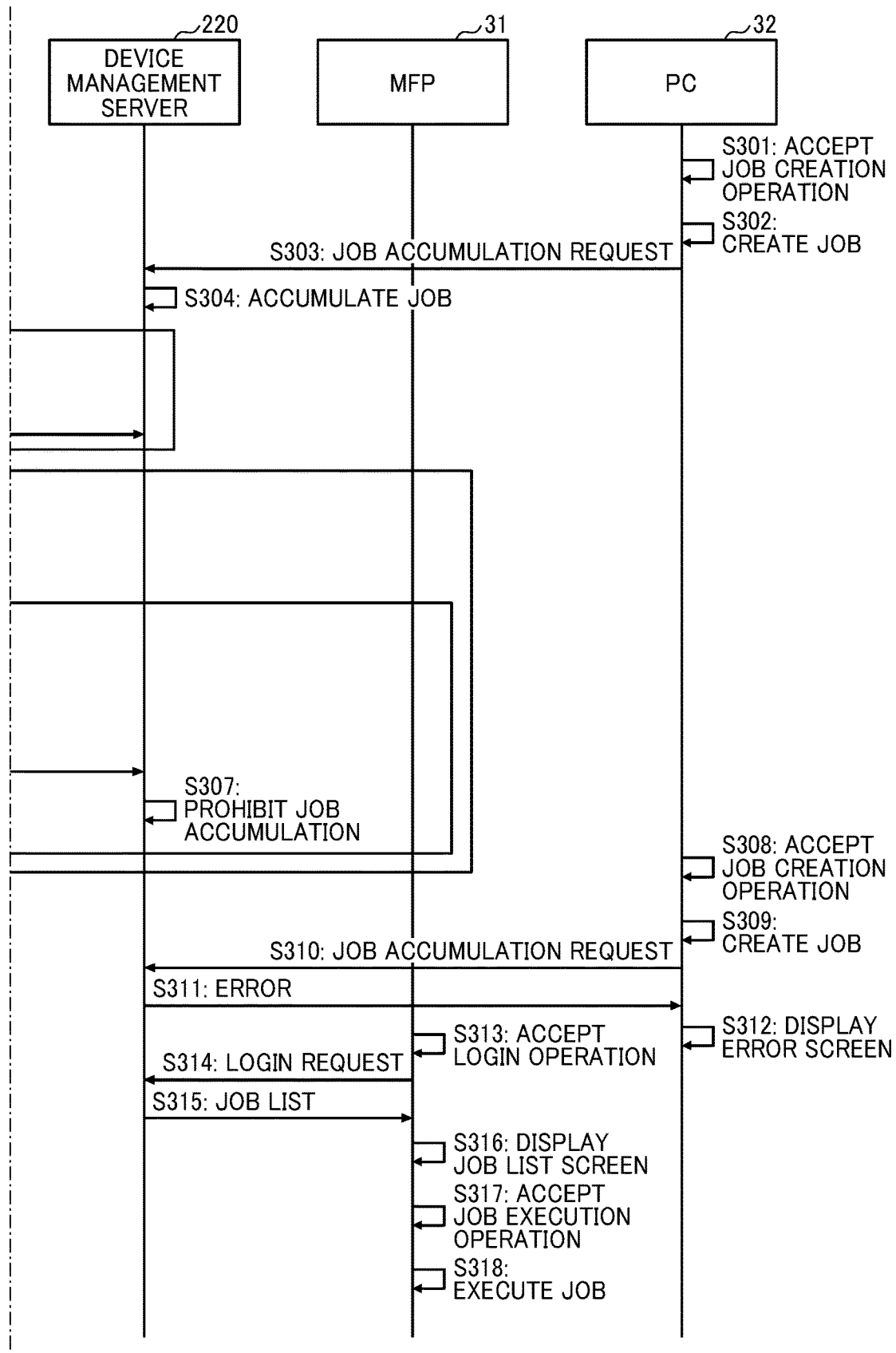

Overall Process that is Performed in Case of Prohibiting Accumulation of Print Job Hereinafter, a process for prohibiting accumulation of a print job that is performed in a case where, among the costs of the virtual servers (the administering server 210 and the device management server 220), the memory cost reaches a predetermined threshold (for example, 95% of the upper limit) is described with reference to FIG. 10. FIG. 10 is a sequence chart illustrating an example overall process that is performed in the cost management system 1 in a case of prohibiting accumulation of a job. The process from step S101 to step S104 in FIG. 10 is the same as that in FIG. 6, and therefore, a description thereof is omitted.

First, in the case of prohibiting accumulation of a print job, a process for accumulating a print job in the device management server 220 performed in step S301 to step S304 is described.

The input accepting unit 921 of the PC 32 accepts input of a job creation operation performed by the user (step S301). The user can perform the job creation operation by, for example, performing a print instruction operation for some print target using a print application (for example, a document creation application, an image editing application, or a browser) installed in the PC 32.

Next, the job creating unit 923 of the PC 32 creates a print job (step S302). The print job includes, for example, data (print target data) representing the print target and print settings.

Next, the job creating unit 923 of the PC 32 transmits a job accumulation request that includes the print job created in step S302 described above to the device management server 220 (step S303). At this time, the job creating unit 923 transmits the job accumulation request to the device management server 220 that manages the PC 32.

When the job accumulation request is received, the job managing unit 803 of the device management server 220 stores the print job included in the job accumulation request in the job storage unit 804 (step S304). Accordingly, the print job is stored in the device management server 220.

A case is described below where it is determined in step S104 in FIG. 10 that, among the pieces of cost condition information illustrated in FIG. 5, the cost condition indicated by the piece of cost condition information having the cost condition name "accumulation prohibition" is satisfied.

In this case, the accumulation prohibition requesting unit 504 of the cost management apparatus 10 transmits a job accumulation prohibition request to the administering server 210 that is used when the client uses a user service (step S305).

In the case where the administering server 210 is not configured, the accumulation prohibition requesting unit 504 needs to transmit a job accumulation prohibition request to the device management server 220 that is used when the client uses a user service.

Next, the accumulation prohibition requesting unit 702 of the administering server 210 transmits the job accumulation prohibition request to the device management server 220 managed by the administering server 210 (step S306).

When the job accumulation prohibition request is received, the job managing unit 803 of each device management server 220 prohibits accumulation of a print job in the job storage unit 804 (step S307). Thereafter, even if a print job is received from the PC 32, accumulation of the print job is prohibited.

The process from step S308 to step S312 that is performed in a case where a print job is created by the PC 32 and transmitted to the device management server 220 while accumulation of a print job is prohibited is described. The process from step S308 to step S310 is the same as the process from step S301 to S303 described above, and therefore, a description thereof is omitted.

When a job accumulation request is received, the job managing unit 803 of the device management server 220 transmits to the PC 32 an error message stating that accumulation of a print job is prohibited (step S311).

When the error message is received from the device management server 220, the display control unit 922 of the PC 32 displays on the display 302 an error screen indicating that accumulation of the print job is prohibited (step S312). As described above, when accumulation of a print job in the device management server 220 is prohibited, for example, it is possible to prevent a situation where, among the costs (charges) of the virtual servers, the memory cost exceeds a predetermined budget.

Even in the case where accumulation of a print job is prohibited, a print job that has already been accumulated can be executed. A case where the MFP 31 executes a print job obtained from the device management server 220 in the subsequent steps, namely, step S313 to step S318, is described.

First, the input accepting unit 911 of the MFP 31 accepts a login operation (step S313). The login operation can be performed by, for example, inputting a user ID and a password and pressing the login button on the login screen displayed by the display control unit 912.

When the input accepting unit 911 accepts the login operation, the login unit 913 of the MFP 31 transmits a login request to the device management server 220 (step S314). The login request includes, for example, the user ID and the password input via the login operation.

The authenticating unit 802 of the device management server 220 performs an authentication process (for example, a process for checking the validity of the user ID and the password included in the login request) in response to the login request. In a case where the authentication process by the authenticating unit 802 is successful, the job managing unit 803 transmits a job list to the MFP 31 (step S315) The job list is a list of print jobs that can be executed for the user for which the authentication process is successfully completed among print jobs stored in the job storage unit 804.

When the job list is received, the display control unit 912 of the MFP 31 displays on the control panel 402 a job list screen that includes the job list (step S316). The input accepting unit 911 of the MFP 31 accepts selection of a print job and an execution operation for the print job performed by the user on the job list screen (step S317).

Then, the job executing unit 914 of the MFP 31 executes the print job relating to the execution operation (step S318). Accordingly, the print target data included in the print job is printed on a print medium in accordance with the print settings.

The print job executed by the job executing unit 914 may be immediately deleted from the job storage unit 804 of the device management server 220 or may be deleted at a predetermined timing (for example, at the end of the month). Alternatively, the print job may be deleted after a predetermined time has passed (for example, after one week).

As described above, in the cost management system 1 according to this embodiment, for example, the login screen of the MFP 31 is changed, and accumulation of a job in the virtual server is prohibited in accordance with the amount of resource usage by the virtual servers that are used when a user service is used. Accordingly, with the cost management system 1 according to this embodiment, it is possible to prevent a situation where the cost (charge) of the virtual servers that is incurred in accordance with the amount of resource usage exceeds a predetermined budget. Consequently, the client using a user service can use the user service within the budget.

In this embodiment, the case of changing the login screen of the MFP 31 (the case of displaying the predetermined warning and the case of prohibiting a login) and the case of prohibiting accumulation of a print job in the device management server 220 have been described. Both the changing of the login screen of the MFP 31 and the prohibiting of accumulation of a print job in the device management server 220 may be performed. For example, the predetermined warning may be displayed on the login screen of the MFP 31, and furthermore, accumulation of a print job in the device management server 220 may be prohibited. Alternatively, for example, a login to the MFP 31 may be prohibited, and furthermore, accumulation of a print job in the device management server 220 may be prohibited.

The present invention is not limited to the embodiment specifically disclosed above, and various modifications and changes can be made without departing from the scope of the claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
a first server configured to control usage of a service to be provided to a user via a device, the first server including first processing circuitry, and
a second server configured to accumulate one or more jobs relating to the service, the second server including second processing circuitry,
wherein the first processing circuitry and the second processing circuitry are configured to operate in cooperation with each other to:
obtain information on a total amount of previous resource usage over a predetermined time period by the second server in providing the service;
determine whether the total amount of previous resource usage satisfies at least one condition of a plurality of conditions previously set based on preset limits on resource usage; and
when the total amount of previous resource usage is determined to satisfy the at least one condition of the plurality of conditions, perform, in accordance with the at least one condition, at least one of a plurality of control operations, the control operations including a control operation for changing a screen displayed by the device, and a control operation for restricting accumulation of the one or more jobs in the second server.

2. The information processing system according to claim 1, wherein the control operation for changing the screen displayed by the device includes one of:
changing a login screen of the device to display a warning on the login screen; and
changing the login screen to prevent a login to the device.

3. The information processing system according to claim 2, wherein the control operation for restricting accumulation of the jobs includes prohibiting accumulation of the jobs in the second server.

4. The information processing system according to claim 3, wherein
the total amount of previous resource usage includes a total amount of memory usage by the second server,
the plurality of conditions includes:
a first condition indicating whether the total amount of memory usage is equal to or larger than a first threshold and smaller than a second threshold, the first threshold being smaller than the second threshold; and
a second condition indicating whether the total amount of memory usage is equal to or larger than the second threshold, and
the first processing circuitry and the second processing circuitry are further configured to operate in cooperation with each other to:
when the first condition is determined to be satisfied, perform the control operation for changing the login screen of the device to display the warning on the login screen, and
when the second condition is determined to be satisfied, perform the control operation for prohibiting accumulation of the jobs in the second server.

5. The information processing system according to claim 4, wherein
the total amount of previous resource usage further includes a total amount of network usage by the second server,
the plurality of conditions further includes:

a third condition indicating whether the total amount of network usage is equal to or larger than a third threshold and smaller than a fourth threshold, the third threshold being smaller than the fourth threshold; and a fourth condition indicating whether the total amount of network usage is equal to or larger than the fourth threshold, and the first processing circuitry and the second processing circuitry are configured to operate in cooperation with each other to:

when the third condition is determined to be satisfied, perform the control operation for changing the login screen of the device to display the warning on the login screen; and when the fourth condition is determined to be satisfied, perform the control operation for changing the login screen to prevent a login to the device.

6. The information processing system according to claim 2, wherein when the control operation includes the changing a login screen of the device to display a warning on the login screen, the first processing circuitry of the first server is configured to request the device to display the warning on the login screen, and when the control operation includes the changing a login screen to prevent a login to the device, the first processing circuitry of the first server is configured to request the device to change the login screen to prevent a login to the device.

7. The information processing system according to claim 2, wherein the first processing circuitry and the second processing circuitry are further configured to operate in cooperation with each other to, when the control operation includes the changing a login screen to prevent a login to the device, perform one of a plurality of control operations including:

a control operation for hiding a login button that is displayed on the login screen;

a control operation for invalidating an operation performed on the login button; and a control operation for displaying an error message when an operation is performed on the login button.

8. The information processing system according to claim 1, wherein the second server is a virtual server, the first server includes a plurality of servers, one of the plurality of servers being configured to collect the total amount of previous resource usage by the virtual server, and the first server is configured to determine whether to perform at least of the plurality of control operations so as to manage the total amount of previous resource usage by the virtual server to not exceed a predetermined limit.

9. An information processing apparatus, comprising:
processing circuitry configured to
obtain information on a total amount of previous resource usage over a predetermined time period by a device management server in providing a service to a user via a device, the device management server being configured to accumulate one or more jobs relating to the service;
determine whether the total amount of previous resource usage satisfies at least one condition of a plurality of conditions previously set based on preset limits on resource usage; and
when the total amount of previous resource usage is determined to satisfy the at least one condition of the plurality of conditions, perform, in accordance with the at least one condition, at least one of a plurality of control operations, the control operations including a control operation for changing a screen displayed by the device, and a control operation for restricting accumulation of the one or more jobs in the device management server.

10. The information processing apparatus according to claim 9, wherein the control operation for changing the screen displayed by the device includes one of:

changing a login screen of the device to display a warning on the login screen; and changing the login screen to prevent a login to the device.

11. The information processing apparatus according to claim 10, wherein the control operation for restricting accumulation of the jobs includes prohibiting accumulation of the jobs in the device management server.

12. The information processing apparatus according to claim 11, wherein the total amount of previous resource usage includes a total amount of memory usage by the device management server, the plurality of conditions includes:

a first condition indicating whether the total amount of memory usage is equal to or larger than a first threshold and smaller than a second threshold, the first threshold being smaller than the second threshold; and a second condition indicating whether the total amount of memory usage is equal to or larger than the second threshold, and the processing circuitry is configured to, when the first condition is determined to be satisfied, perform the control operation for changing the login screen of the device to display the warning on the login screen, and when the second condition is determined to be satisfied, perform the control operation for prohibiting accumulation of the jobs in the device management server.

13. The information processing apparatus according to claim 12, wherein the total amount of previous resource usage further includes a total amount of network usage by the device management server, the plurality of conditions further includes:

a third condition indicating whether the total amount of network usage is equal to or larger than a third threshold and smaller than a fourth threshold, the third threshold being smaller than the fourth threshold; and a fourth condition indicating whether the total amount of network usage is equal to or larger than the fourth threshold, and the processing circuitry is configured to, when the third condition is determined to be satisfied, perform the control operation for changing the login screen of the device to display the warning on the login screen; and when the fourth condition is determined to be satisfied, perform the control operation for changing the login screen to prevent a login to the device.

14. The information processing apparatus according to claim 10, wherein the processing circuitry is further configured to, when the control operation includes the changing a login screen to prevent a login to the device, perform one of a plurality of control operations including:
 a control operation for hiding a login button that is displayed on the login screen;
 a control operation for invalidating an operation performed on the login button; and
 a control operation for displaying an error message when an operation is performed on the login button.

15. An information processing method comprising:
 obtaining information on a total amount of previous resource usage over a predetermined time period by a device management server in providing a service to a user via a device, the device management server being configured to accumulate one or more jobs relating to the service;
 determining whether the total amount of previous resource usage satisfies at least one condition of a plurality of conditions previously set based on preset limits of resource usage; and
 when the determining that the total amount of previous resource usage satisfies the at least one condition of the plurality of conditions, performing, in accordance with the at least one condition, at least one of a plurality of control operations, the control operations including a control operation for changing a screen displayed by the device, and a control operation for restricting accumulation of the one or more jobs in the device management server.

16. The information processing method according to claim 15, wherein the control operation for changing the screen displayed by the device includes one of:
 changing a login screen of the device to display a warning on the login screen; and
 changing the login screen to prevent a login to the device.

17. The information processing method according to claim 16, wherein the control operation for restricting accumulation of the jobs includes prohibiting accumulation of the jobs in the device management server.

18. The information processing method according to claim 17, wherein
 the total amount of previous resource usage includes a total amount of memory usage by the device management server, and
 the plurality of conditions includes:
  a first condition indicating whether the total amount of memory usage is equal to or larger than a first threshold and smaller than a second threshold, the first threshold being smaller than the second threshold; and
  a second condition indicating whether the total amount of memory usage is equal to or larger than the second threshold,
 when the determining that the first condition is satisfied, the performing step includes performing the control operation for changing the login screen of the device to display the warning on the login screen, and
 when the determining that the second condition is satisfied, the performing step includes performing the control operation for prohibiting accumulation of the jobs in the device management server.

19. The information processing method according to claim 18, wherein
 the total amount of previous resource usage further includes a total amount of network usage by the device management server,
 the plurality of conditions further includes:
  a third condition indicating whether the total amount of network usage is equal to or larger than a third threshold and smaller than a fourth threshold, the third threshold being smaller than the fourth threshold; and
  a fourth condition indicating whether the total amount of network usage is equal to or larger than the fourth threshold, and
 when the determining that the third condition is satisfied, the performing step includes performing the control operation for changing the login screen of the device to display the warning on the login screen; and
 when the determining that the fourth condition is satisfied, the performing step includes performing the control operation for changing the login screen to prevent a login to the device.

20. The information processing method according to claim 16, wherein when the control operation includes the changing a login screen to prevent a login to the device, the method further comprising performing one of a plurality of control operations including:
 a control operation for hiding a login button that is displayed on the login screen;
 a control operation for invalidating an operation performed on the login button; and
 a control operation for displaying an error message when an operation is performed on the login button.

* * * * *